May 27, 1930.  D. D. SHEWMON  1,759,873
APPARATUS FOR MEASURING THE LIQUID CONTENTS OF VESSELS
Filed March 6, 1923  2 Sheets-Sheet 1
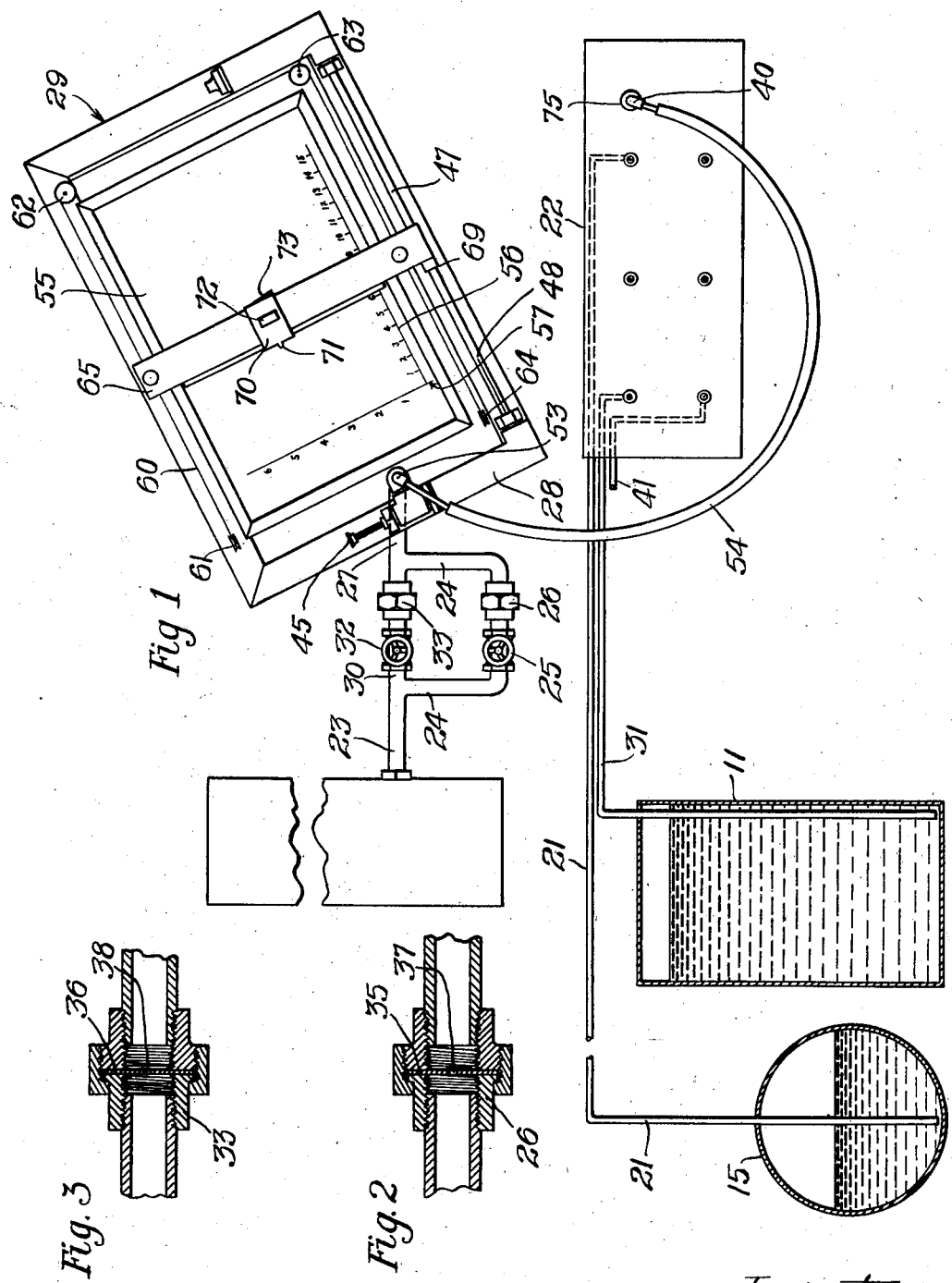
Inventor
Dan Dimmitt Shewmon
by H. A. Patterson
Atty.

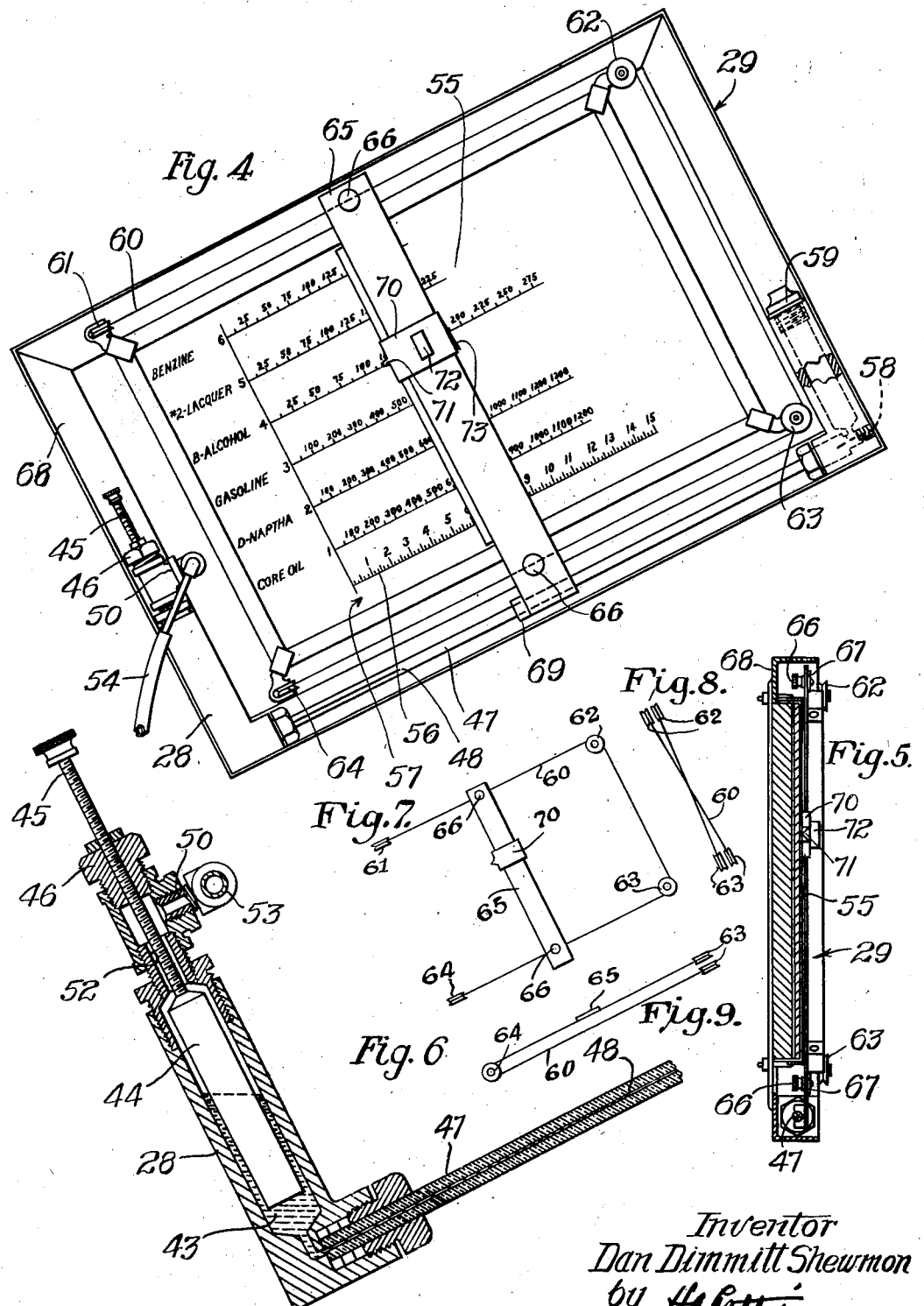

Patented May 27, 1930

1,759,873

UNITED STATES PATENT OFFICE

DAN DIMMITT SHEWMON, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR MEASURING THE LIQUID CONTENTS OF VESSELS

Application filed March 6, 1923. Serial No. 623,184.

This invention relates to an apparatus for measuring the liquid contents of vessels and more particularly to a system wherein such measurements are controlled from a distant point.

It is often desirable to determine at a central point the amounts of liquids differing widely in character and contained in a plurality of vessels or tanks of different shapes or sizes. In order to expedite the measurement of the contents of tanks in arrangements of this nature it is desirable that a common indicating device be employed which may be readily and quickly associated with the individual tanks of the system and for the measurements to be dependable it is desirable that the chances of error be minimized.

It is an object of the invention to improve and simplify the measurement of the volumes of liquids varying in character and contained in vessels of varying sizes and shapes.

An additional object is to improve the means for directly indicating the amount of liquid in a vessel.

In order to attain these objects in accordance with features of the invention an individual conduit extending from a predetermined distance above the bottom of each tank in the system ends in a terminal board at a central observation point for selective and exclusive association, through a common conduit, with a common measuring device, preferably of the manometer type. Sufficient compressed gaseous medium is admitted to the selected individual conduit to expel the liquid therefrom and the main supply of gas is then disconnected therefrom but sufficient gas flows continuously into the conduit to compensate for possible slight leakages. The gas thus retained in the conduit causes the indicating liquid in the manometer to rise to a point dependent upon the height of the surface of the liquid in the tank above the opening in the submerged conduit. An index which may be set in accordance with the meniscus of the liquid in the manometer cooperates with a chart having a plurality of scales thereon calibrated in accordance with the sizes and shapes of the tanks in the system, as well as the character of the liquid contained therein, thereby indicating directly the amount of the liquid in the selected tank.

These and other features will be fully comprehended from the following description and the accompanying drawings in which, Fig. 1 shows in schematic form the general system;

Fig. 2 is a sectional view of the main supply pipe containing an apertured diaphragm through which the compressed air or other gas is admitted to the conduit;

Fig. 3 is a similar view of the auxiliary conduit and the associated apertured diaphragm through which a restricted amount of air or other gas is supplied to the system;

Fig. 4 is a plan view of the calibrated chart, the index, and the manometer, a portion of the latter of which is shown as a broken section;

Fig. 5 is a vertical cross-sectional view of the indicating chart;

Fig. 6 is a cross-sectional view of the manometer and the associated air connections, and Figs. 7, 8 and 9 schematically illustrate the arrangement of the pulleys and the continuous belt as shown in Figs. 4 and 5.

Referring in detail to the figures in which similar reference characters are employed to denote similar parts, each of a plurality of tanks, such as 11 and 15 is provided with a conduit such as conduits 21, 31 and 41, extending downwardly in the liquid contents of the tank to within a certain predetermined distance above the bottom of the tank. The lower end of each conduit is provided with an opening so that normally the liquid extends upwardly into the conduit to approximately the same level as the liquid outside of the conduit. Each of the conduits ends in a socket or other suitable fixture at a terminal board 22 located at some central observation point. At this point there is also provided a main line conduit 23 which is connected with some suitable source of compressed air or other similar agent. A branch conduit 24 including a hand valve 25 and a union 26 is connected with the conduit 23 and with a conduit 27 leading to the manometer indicated generally by the character 28, mounted upon an indicating board 29. Another conduit 30 also interconnects conduits 23 and 27 in parallel with conduit 24 and in this conduit is another hand valve 32 and a union 33. Located within the unions 26 and 33 are diaphragms 35 and 36 respectively which are provided with central openings 37 and 38 and it will be noted that the opening 37 is of considerably greater diameter than opening 38.

The manometer 28 consists principally of a chamber 43 containing mercury or other suitable liquid and a plunger 44 operating in such chamber and adjustable by means of a thumb screw 45 threadedly engaging a plug 46. All portions of the manometer in contact with the indicating liquid are made of material which is not deleteriously affected by such liquid. At the bottom of, and connected at right angles with the reduced portion of the chamber 43 is a tube 47, preferably of glass, into which the mercury may be forced due to air or other medium entering the chamber 43 above the surface of the liquid therein. In this way the meniscus 48 of the liquid in the tube 47 indicates the amount of pressure exerted upon the surface of the liquid in the chamber 43. The other end of the glass tube 47 is connected with a relief chamber 58 terminating in a plug 59 whereby the pressure of the air in the chamber may be released. The conduit 27 is attached to the manometer through a union 50 and the air therein flows into the chamber 43 through the passage 52. Also attached to the union 50 is an extension conduit 53 to the free end of which a flexible tube 54 is attached which terminates in a suitable connecting plug 40 adapted for insertion in the various sockets in which the conduits terminate in the board 22.

Upon the exposed surface of the indicating board 29 is a chart 55 containing individual scales for each of the receptacles in the system. These scales are calibrated in accordance with the size and shape of the tank, as well as the specific gravity or other characteristics of the liquid contained in such tank and are arranged to indicate directly in units of volume the contents therein. A common scale 56 indicates in inches the distance from a zero reading line 57 at the left of the other reading scales.

A continuous belt 60 carried around and supported by pulleys 61, 62, 63 and 64, which pulleys may be suitably mounted at the four corners of the chart is attached to a member 65 by means of thumb screws 66 and cooperating washers 67. The belt 60 moves freely over the pulleys in response to the sliding of the member 65 and insures the parallel movement of the member as it passes over the chart. It is believed that the arrangement of the pulleys and the associated endless belt is clearly shown in Figs. 4 and 5. The arrangement is further illustrated schematically in Figs. 7, 8 and 9. The path of the endless belt may be traced as follows: From one end of the member 65 to which it is secured by the thumb screw 66, around the upper pulley 63 (Fig. 4), the lower pulley 62, the pulley 61 and then to the opposite end of the member 65 to which it is secured, around the upper pulley 62, the lower pulley 63 and around the pulley 64 back to the member 65. The framework 68 composed of angles suitably joined at the corners serves to support the indicating chart and the manometer. An index 69 carried by the lower end of the member 65 is located over the glass tube 47 of the manometer and is adapted to be placed in position directly over the meniscus of the manometer. Carried by the member 65 is an adjustable indexing device 70 adapted to be moved along the member until a pointer 71 is directly over a scale corresponding to the tank under observation. The index 70 can be readily moved by means of a finger grip 72 and is retained in its set position by any suitable means such as a spring member 73 which bears against one edge of the member 65.

The thumb screw 45 is adjusted to move the plunger 44 in the chamber 43 in such a way as to bring the meniscus of the manometer in line with the zero line 57 of the various scales. The plug 40 of the flexible conduit or tube 54 is then placed in the terminating socket of the conduit leading to the tank, the liquid contents of which are to be measured. Due to the fact that the valve 32 is maintained open during the complete operation of the system a restricted amount of compressed gas is flowing at this time from the source through the opening 38 in the diaphragm 36 and into the conduit 54. The operator then opens the valve 25 thus admitting gas in larger volume from the source through the large opening 37 in the diaphragm 35 through the conduit 54 and the plug 40 into the individual conduit, such as 21, leading into the tank under observation which may be assumed as being tank 15. This gas flowing into the conduit 21 expels all of the liquid therefrom and when such result has been accomplished as indicated by the meniscus of the manometer remaining in a stationary position the valve 25 is reclosed. However, due to the fact that valve 32 is open, a restricted amount of gas continues to flow into the conduit 21 from the source. This small current of gas continuously flowing into the system overcomes any loss of pressure exerted by the air which is being admitted to the conduit 21 for the purpose of expelling the liquid therefrom. Such loss of pressure might be occasioned by slow leakages in the system and might cause a considerable amount of error in the measurement of the contents. The gas contained in the conduit 21 and the conduit 54 exerts a pressure upon the indicating liquid in the chamber 43 of the manometer which bears a proportion to the height of liquid in the tank 15 above the opening in the bottom of the conduit 21. Therefore, the liquid in the chamber 43 flows into the glass tube 47 a distance which is in proportion to the height of the liquid in the tank so that the meniscus is an indication of such height. The operator then moves the member 65 until the index 69 is directly over the upper end of the indicating column and moves the index 70 until the pointer 71 thereof is directly over the scale corresponding to the tank under observation, which in the case of tank 15 may be assumed as scale No. 4. The indication or the number appearing directly under the pointer 71 thus indicates in gallons, or other units of measurement by volume, the liquid contents of the tank under observation. After each measurement the plug 40 of the conduit 54 is returned to a socket 75 on the board 22 which is not connected with any particular tank. The same procedure will be followed in measuring the liquid contents of the tank 11 through the conduit 31 or of the tank which is associated with the conduit 41.

Although only two tanks of two shapes are shown it is evident that by this invention the contents of receptacles of various shapes and containing liquids of different types and that the receptacles may be located at any distance from the observing point and may be placed either above or below the surface of the earth. In fact the tanks may be located above the observation point if desired.

The manometer and the associated indicating board are shown with the tube 47 at approximately 27° from the horizontal since such an angle gives a sufficiently great movement to the indicating liquid to provide for an accurate reading of the contents of the tanks. However, it is not necessary that this angle be maintained for the proper operation of the system. Furthermore it is evident that by the use of scale 56 the height in inches of the manometer indicating liquid may be readily determined and the amount of liquid of a known character in a tank of known size and shape may be calculated therefrom even though a specially calibrated scale is not available.

What is claimed is:

1. In a volume indicating apparatus for selective association with liquid in a plurality of vessels through an interposed body of gas, a pressure indicating means responsive to the pressure exerted upon the body of gas by the liquid in a selected vessel, a chart having scales calibrated for the various vessels, and an indicating member adjustable to agree with the indication of the pressure indicating means when associated with one of the vessels and co-operating with the scale calibrated therefor to indicate the amount of liquid in the vessel.

2. In a volume indicating device for selective association with liquid in a plurality of vessels through an interposed body of gas, a manometer responsive to the pressure exerted upon the body of gas by the liquid in a selected vessel, a chart having indicating scales calibrated for the various vessels, a movable member and an index member carried thereby and adjustable thereon to agree with the meniscus of the manometer, and with the scale calibrated for the selected vessel to thereby indicate on such scale the amount of liquid in the vessel.

3. In a volume indicating apparatus for selective association with liquid in a plurality of vessels through an interposed body of gas, a U-tube manometer responsive to the pressure exerted by the liquid in a selected vessel, a chart having a plurality of scales each paralleling the indicating column of the manometer and calibrated to agree with one of the various vessels, a member having an indexing portion, means for moving the member parallel to the column to position the indexing portion in agreement with the meniscus thereof, and an index adjustable along the member to indicate on the scale calibrated for the selected vessel the amount of liquid therein.

4. In a volume indicating apparatus for selectively indicating the amounts of liquid in a plurality of vessels, a framework, a U-tube manometer supported thereon and designed for selective association with a body of gas interposed between the manometer and the liquid in a selected one of the vessels, a chart mounted on the framework and having indicating scales paralleling the indicating column of the manometer, an endless belt supported by the framework, a member attached to the belt at two points and movable therewith in a direction parallel to the scales on the chart to a position agreeing with the meniscus of the manometer, and an index member adjustable on the member to agree with the scale calibrated for the selected vessel to thereby indicate on the chart the amount of liquid in the selected vessel.

5. In a volume indicating apparatus for selectively indicating the amounts of liquid in a plurality of vessels, a framework, a U-tube manometer supported thereon and designed for selective association with a body of gas interposed between the manometer and the liquid in a selected one of the vessels, a chart mounted on the framework and having indicating scales paralleling the indicating column of the manometer, a guide supported by the framework, a member attached to the guide and movable in a direction parallel to the scales to a position agreeing with the meniscus of the manometer, and an index member adjustable on the member to agree with the scale calibrated for the selected vessel to thereby indicate the amount of liquid in the selected vessel.

In witness whereof, I hereunto subscribe my name this 22nd day of February, A. D. 1923.

DAN DIMMITT SHEWMON.